United States Patent Office 3,556,962
Patented Jan. 19, 1971

3,556,962
METHOD FOR RECLAIMING COPPER SCRAP CONTAINING TITANIUM AND/OR IRON
Michael J. Pryor, Woodbridge, and Stephen F. Hager, Madison, Conn., assignors to Olin Corporation, a corporation of Virginia
No Drawing. Filed Jan. 24, 1968, Ser. No. 700,025
Int. Cl. C22d 1/16
U.S. Cl. 204—108                                   7 Claims

ABSTRACT OF THE DISCLOSURE

This disclosure teaches the reclamation of copper from copper containing scrap by electrochemical treatment of the scrap material. This disclosure has particular reference to the recovery of copper values from composite materials.

---

It is highly desirable to conveniently and inexpensively reclaim scrap metal. A particular problem exists in the field of composite metals wherein one metal is integrally bonded to one or more dissimilar metals in order to obtain properties which are difficult or impossible to attain in single metals or alloys. Recently, composite metals have been growing in popularity in a variety of fields due to the fact that they can relatively inexpensively achieve a variety of physical properties.

Naturally, the wide use of composite metals has resulted in a large amount of scrap material. Some composite metal scrap can be readily remelted, thereby recovering most of the essential metal values. However, such composites are in the minority. More often the melting down of most composites results in alloys which have little or no commercial use. In such cases, the pure metals in such alloys must be separated from the alloy, for example, by volatilization of the more volatile metal or by selective leaching as a secondary step. The steps naturally greatly increase the cost and complicate the process and are not always technically feasible.

Thus, for many materials there is no commercially attractive process for reclaiming metal values. Particularly difficlt to reclaim are metal composites containing copper or copper alloys bonded to titanium and its alloys and iron and its alloys, including steel, austenitic or ferritic stainless steels, and iron-chromium alloys. The only means of recovering copper values from these composites is by a leaching process which is slow, expensive, exhibits low recoveries and will not work where the copper alloy is the core of the composite.

Accordingly, it is a principal object of the present invention to provide a method for reclaiming metal scrap.

It is a further object of the present invention to provide a method for reclaiming copper values from copper containing metal scrap.

It is a further particular object of the present invention to provide a method for reclaiming copper values from composite metal materials.

It is an additional object of the present invention to provide a method as aforesaid which is relatively inexpensive and convenient to operate.

Further objects and advantages of the present invention will appear from the ensuing discussion.

In accordance with the present invention it has now been found that the foregoing objects and advantages are readily achieved. Accordingly, the process of the present invention provides a method for recovering copper from copper containing scrap material which comprises:

(A) Providing a copper containing scrap material;
(B) Immersing said material in an aqueous acidic electrolyte having a temperature between 0 and 100° C.;
(C) Passing an electric current through said electrolyte between a metallic cathode and said material as anode, said current being sufficient to maintain the potential of said material between −0.5 and +4.0 volts on the hydrogen scale; and
(D) Depositing copper on said cathode, thereby recovering copper from said scrap material.

In the preferred embodiment the process of the present invention comprises:

(A) Providing a copper containing scrap material which is a composite wherein a first component is either copper or a copper base alloy and wherein a second component is a dissimilar metal, preferably titanium and its alloys and iron and its alloys, including steel, and austenitic or ferritic stainless steels. The first component is preferably the cladding and may be clad on one or both sides.

(B) Immersing said material in an aqueous acidic electrolyte having a temperature between 0 and 100° C. The electrolyte should be such that it passivates the second component of the composite to yield passive currents of less than 10 milliamps per square centimeter and the electrolyte should also be such that it anodically dissolves the first component of the composite at the same potential and with anodic polarization of less than 100 millivolts per milliamp.

(C) Passing an electric current through said electrolyte between a metallic cathode and said material as anode, said current being sufficient to maintain the potential of said material between −0.5 and +4.0 volts on the hydrogen scale.

(D) Depositing copper on said cathode, thereby recovering copper from said scrap material.

As stated hereinabove, the preferred embodiment of the present invention utilizes as scrap material an integral, bonded metal composite wherein a first component thereof is copper or a copper alloy and wherein a second component thereof is titanium and its alloys and iron and iron alloys, including steel, austenitic stainless steel and ferritic stainless steel.

With the exception of copper and its alloys, the metals and the alloys listed hereinabove are capable of being passivated anodically in a variety of electrolytes. For example, iron and low alloy steels can be passivated anodically in sulfuric and nitric acids and in neutral salts, such as sodium borate, acetate, tartrate, phosphate, etc. Stainless steels can be passivated anodically in the same solutions plus dilute hydrochloric acid. Titanium and its alloys can be passivated anodically in the same solutions including more concentrated hydrochloric acid, perchloric acid and sodium chloride. All of these solutions produce low anodic polarization of copper and its alloys within passive potential range. Based on this observation, the process of the present invention provides a relatively simple and inexpensive method of electrochemical composite scrap treatment In accordance with the present invention, the shape or form of the scrap material is not particularly critical. As stated hereinabove, the preferred process of the present invention utilizes an integral, bonded metal composite wherein a first component thereof is copper or a copper base alloy and wherein a second component thereof is titanium and its alloys or iron and its alloys, including austenitic or ferritic stainless steels. By proper control of treatment conditions, however, copper values alone may be recovered from copper alloys, if desired. Thus, it can be seen that the process of the present invention has wide application to a variety of materials.

One of the most universal and preferred electrolytes of the present invention is an aqueous bath containing sulfuric acid in a concentration of from 1 to 25% by weight. Naturally, the bath may contain amounts of other materials in order to modify the bath for a particular purpose. Thus, for example, in the case of reclamation of copper from coppor alloys containing lead it may be desirable to add nitric acid to the bath in order to prevent anodic polarization of the copper alloys containing lead. Alternately, other electrolytes specified hereinabove may be used depending on the nature of the other metals in the composite.

In accordance with the process of the present invention, the compacted scrap material is immersed in the foregoing bath and is maintained by application of external current within the passive potential range of the noncopper components of the composite, i.e., between —0.5 and +4.0 volts depending on the electrolyte and the composite. The scrap material is the anode and thus must be connetced to a metallic cathode placed in the same electrolyte. With composite materials containing iron, mild steel, ferritic and austenitic stainless steels the maximum potential should not exceed +2.0 volts on the hydrogen scale; whereas, with the titanium and its alloys higher voltages of up to +4.0 volts may be utilized. Maximum voltages are specified since if these are exceeded the passivated alloy will no longer react as a passive electrode from which very low currents may be drawn; instead, additional current is drawn due to the evolution of oxygen from the passive surface and the selectivity of the refining process is reduced.

In general, an increase in the anodic potential results in increasing the dissolution rate of the copper alloy cladding. However, in steels containing a significant amount of chromium, it is not desirable to utilize anodic potentials in excess of +2.0 volts on the hydrogen scale. Significant amounts of chromate ions are formed by anodic oxidation of the chrome containing steels. Accordingly, with composite materials of copper alloys with either austenitic stainless steels or chrome irons, a maximum of +2.0 volts is all that should be used in raising the anodic potential.

During the electrochemical treatment, the metallic copper is dissolved from the anodic scrap material and may be easily recovered as an integral part of the processing. It is highly advantageous to use a copper cathode since the whole cathode can then be melted without contamination. However, other metal cathodes such as platinum, lead, iron, stainless steel, etc. may be used provided that the electrodeposited copper is subsequently stripped mechanically. The electrode potential should be lowered sufficiently at the copper cathode so that the copper ions passing into solution anodically will be deposited as metallic copper on the cathode. Thus, essentially 100% recovery of the copper passing into solution may be obtained by these means, raising the temperature of the bath will generally favor more rapid scrap recovery by reducing polarization of the anodic dissolution of the copper alloy without having a comparable effect on the passive current. In general an operating temperature range of 25–50° C. is preferred but the process will operate economically between 0–100° C.

By control of the cathode potential, as stated hereinabove, copper values alone may be recovered from copper alloys, if desired. For example, in recovering copper from a copper-zinc alloy by maintaining the cathode potential at values more noble than about —0.75 volt on the hydrogen scale, this will result in conditions which cause zinc from anodic dissolution of the copper-zinc alloy to accumulate in solution with accompanying deposition of pure metallic copper on the cathode. In order to prevent the deposition of lead and tin containing these materials, a closer control of the cathodic potential is required. This requires control of the cathode potential at values more noble than about —0.15 volt on the hydrogen scale. This will slow the rate of scrap reclamation, but effectively produces a high grade reclaimed product.

A convenient method of practicing the process of the present invention entails the compacting of the scrap material around a metal rod capable of being passivated in the electrolyte used, such as the materials listed hereinabove. This effectively enables the reclamation of assorted scrap materials. This reclamation method is relatively rapid because of the large difference in anodic currents between the passivation reaction and the anodic dissolution of the copper alloy components. It is only necessary to retain some sort of electrical contact through the compacted composite in order to obtain complete separation from the scrap material.

Similarly, composites with copper or copper alloys positioned on the interior of the composite may also be conveniently handled in accordance with the process of the present invention. This type of scrap material, however, is slower to reclaim.

The process of the present invention and the improvements resulting therefrom will be more readily understandable from a consideration of the following illustrative example.

EXAMPLE I

The following example represents the reclamation of the following scrap material. The core was mild steel. This was clad 20% on both sides with copper alloy 220 containing 10.0% zinc. This scrap material was in the form of a sheet 0.050" thick; it was masked with beeswax-rosin to expose an area of 2 sq. in. to the electrolyte. Electrical connection was made through a soldered and protected lead to a Wenking potentiostat coupled to a platinum sheet cathode of area 10 sq. cms. immersed in the electrolyte. The electrolyte was 500 ml. of 15% sulfuric acid by weight maintained at a temperature of 25° C. An electric current was passed by the potentiostat such that the composite was an anode and was maintained at a potential of +1.0 volt on the hydrogen scale throughout the experiment. At this potential the steel was passive and the alloy 220 exhibited an initial anodic current density of 75 milliamps per square centimeter. This resulted in rapid dissolution of the alloy 220. The copper from the alloy 220 was deposited on the platinum cathode while the zinc accumulated in solution as soluble zinc sulfate. After 150 minutes the alloy 220 was completely removed and the current dropped to a value of 2 milliamps per square centimeter, i.e., the passive current for mild steel in 15% sulfuric acid at a potential of +1.0 volt on the hydrogen scale. The sharpness of the removal of the alloy 220 cladding and the obvious passivation of the steel were clearly apparent. All of the copper in the alloy 220 cladding was found on the platinum cathode.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method of recovering copper from copper containing scrap which comprises:
   (A) providing a copper containing scrap material which is a composite of two components wherein a first component is selected from the group consisting of copper and copper base alloys and wherein a second component is selected from at least one member of the group consisting of titanium and titanium base alloys and iron and iron base alloys,
   (B) immersing said material in a 1 to 25% by weight sulfuric acid electrolyte having a temperature between 0 and 100° C.,
   (C) passing an electric current through said electrolyte between a metallic cathode and said material as anode, said current being sufficient to maintain the potential of said material between —0.5 and +4.0 volts on the hydrogen scale; and, (D) depositing copper on said cathode, thereby recovering copper from said scrap material.

2. A method according to claim 1 wherein said first component is the cladding.

3. A method according to claim 2 wherein said first component is clad on both sides of said second component.

4. A method according to claim 1 wherein said potential is maintained between —0.5 and +0.2 volt on the hydrogen scale.

5. A method according to claim 1 wherein said cathode is copper.

6. A method according to claim 1 wherein said scrap material is compacted around a metallic material capable of being passivated by said electrolyte.

7. A method of recovering copper from copper containing scrap which comprises:

(A) providing a copper containing scrap material which is a composite of two components wherein a first component is selected from the group consisting of copper and copper base alloys and wherein a second component is selected from at least one member of the group consisting of titanium and titanium base alloys and iron and iron base alloys, (B) immersing said material in a 1 to 25% by weight sulfuric acid electrolyte having a temperature between 0 and 100° C., said electrolyte being such that it passivates said second component to yield passive currents of less than 10 milliamps per square centimeter and anodically dissolves said first component at the same potential with anodic polarization of less than 100 millivolts per milliamp, (C) passing an electric current through said electrolyte between a metallic cathode and said material as anode, said current being sufficient to maintain the potential of said material between —0.5 and +4.0 volts on the hydrogen scale, and (D) depositing copper on said cathode, thereby recovering copper from said scrap material.

References Cited

UNITED STATES PATENTS 3,334,029  8/1967  Delafosse et al. _____ 204—32

OTHER REFERENCES

F. C. Mathers et al., The Monthly Review, July 1945, pp. 672–4.

ROBERT K. MIHALEK, Primary Examiner

U.S. Cl. X.R.

204—146